United States Patent

[11] 3,602,166

| [72] | Inventor | Maurice L. Peterson |
| | | Kerkhoven, Minn. 56252 |
| [21] | Appl. No. | 837,019 |
| [22] | Filed | June 27, 1969 |
| [45] | Patented | Aug. 31, 1971 |

[54] CHEMICAL APPLICATOR
14 Claims, 12 Drawing Figs.

[52] U.S. Cl. ..................................................... 111/6, 111/90
[51] Int. Cl. ..................................................... A01c 23/02
[50] Field of Search............................................ 94/39–40, 44; 111/7.1–7.4, 6, 89–90, 88

[56] References Cited
UNITED STATES PATENTS

| 612,745 | 10/1898 | Morris......................... | 111/7.2 |
| 1,424,728 | 8/1922 | Knight et al. ................. | 111/6 |
| 2,649,061 | 8/1953 | Hawkins et al. .............. | 111/6 |
| 2,866,422 | 12/1958 | Colson ......................... | 111/6 |
| 3,025,806 | 3/1962 | Peck............................. | 111/6 |
| 3,143,090 | 8/1964 | Cecil et al..................... | 111/6 |

FOREIGN PATENTS

| 1,107,575 | 8/1955 | France ......................... | 111/6 |
| 6,517,057 | 6/1967 | Netherlands.................. | 111/6 |

*Primary Examiner*—Robert E. Bagwill
*Attorney*—Burd, Braddock & Bartz

ABSTRACT: A machine for injecting fluid chemicals into the ground attachable to the lift arms of a farm tractor. The machine has a number of injector units having rotatable drums carrying spikes adapted to penetrate the ground. Each spike has a dispensing tip having a discharge valve operable to permit the discharge of fluid chemicals when the spike is in ground penetrating down position. A valve operating mechanism functions to open the valve when the spike is in the down position and close the valve when the spike is in the up position out of the ground.

INVENTOR.
MAURICE L. PETERSON
BY
Burd, Braddock & Bartz
ATTORNEYS

Fig. 9

INVENTOR.
MAURICE L. PETERSON
BY
Burd, Braddock & Barty
ATTORNEYS

CHEMICAL APPLICATOR

BACKGROUND OF INVENTION

The chemical applicator implements used to inject liquid chemicals into the ground have earthworking shoes which dig approximately 10 to 12 inch furrows. The chemical fertilizer is introduced behind the shoes. These implements are commonly used to inject a gaseous ammonia fertilizer into the ground. As the ammonia is discharged into the soil, it creates a cooling effect, which at times freezes large amounts of soil to the furrow opening shoes. The expanding ammonia, being continuously discharged behind the shoes, continuously lowers the temperature of the shoes thereby continuously freezing the soil moisture which collects on the shoes. These implements require a considerable amount of power to operate, as the shoes are continuously pulled through the ground. Furthermore, these implements cannot be efficiently used on grassland, as alfalfa, hay, and pasture fields as the shoes make undesirable furrows in the fields.

Rotary fertilizer injectors have been developed to place liquid fertilizers into the soil. The U.S. Pat. to Vaughn, No. 2,876,718, shows a coulter disc having a plurality of radially disposed distributor tubes and valving means for successively connecting the tubes with a source of fluid chemical under pressure. The valving means is located in the central hub carrying the coulter disc. As the liquid chemical leaves the valving means, it enters the distributor tubes where the liquid expands and cools. This cooling causes the soil to freeze and collect on the disc about the tubes. In addition, the liquid fertilizer is always present in the tubes and is free to escape to the atmosphere when the tubes move upwardly from the soil. This fertilizer is lost to the atmosphere, as it is not absorbed by the soil.

SUMMARY OF INVENTION

The invention relates to an implement for injecting a fluid, as a liquid chemical or gas, into a body, as the ground. The implement has a plurality of rotating members carrying outwardly directed spikes or teeth operable to penetrate the ground. Each spike has a ground penetrating tip housing a valve mechanism selectively operable to permit the fluid to flow through the tip when the spike is in the ground penetrating position and block the flow of fluid through the tip when the spike is out of the ground. The valve mechanism is located in close proximity to discharge openings in the tip so that the expansion and cooling of the liquid chemical occurs externally of the spike.

The implement of the invention can be used to inject liquid ammonia to depths approximately 10 to 15 inches into the ground in a pattern that will evenly distribute the liquid ammonia in the ground. The implement can be used with other liquid fertilizers and herbicide solutions.

An object of the invention is to provide an effective and economical machine operable to apply fluid chemicals into fields in any condition, including grasslands and fields containing a large amount of trash. Another object of the invention is to provide a fluid chemical injector apparatus which will not freeze or become clogged with soil in use and which will follow the contour of the ground and yet at the same time have individual sections which will move over rocks and similar objects without interfering with the operation of the apparatus. A further object of the invention to to provide a fluid injector spike with cutoff valves located at the tip of the spikes so as to conserve the maximum amount of fluid chemical and provide for maximum injection of chemical into the soil.

Figure 1:
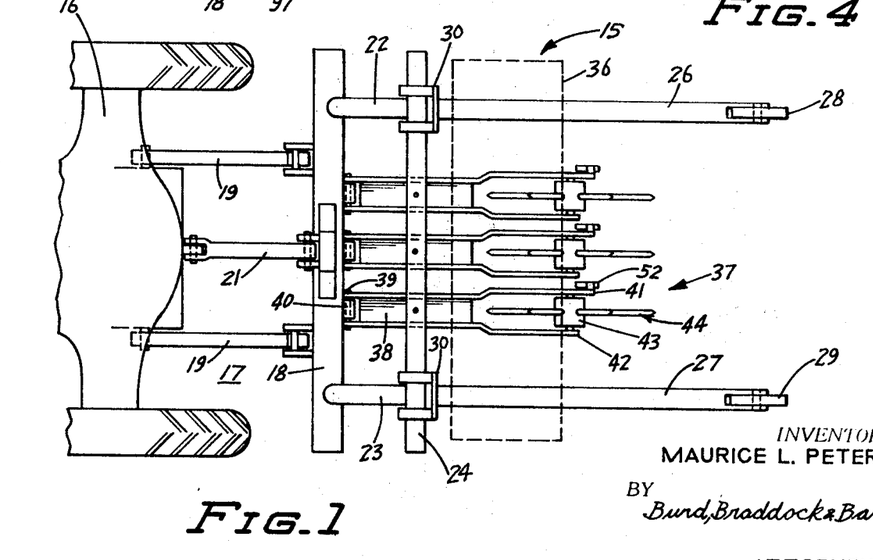
FIG. 1 is a plan view of the chemical applicator of the invention attached to a three point hitch of a tractor.
Figure 2:
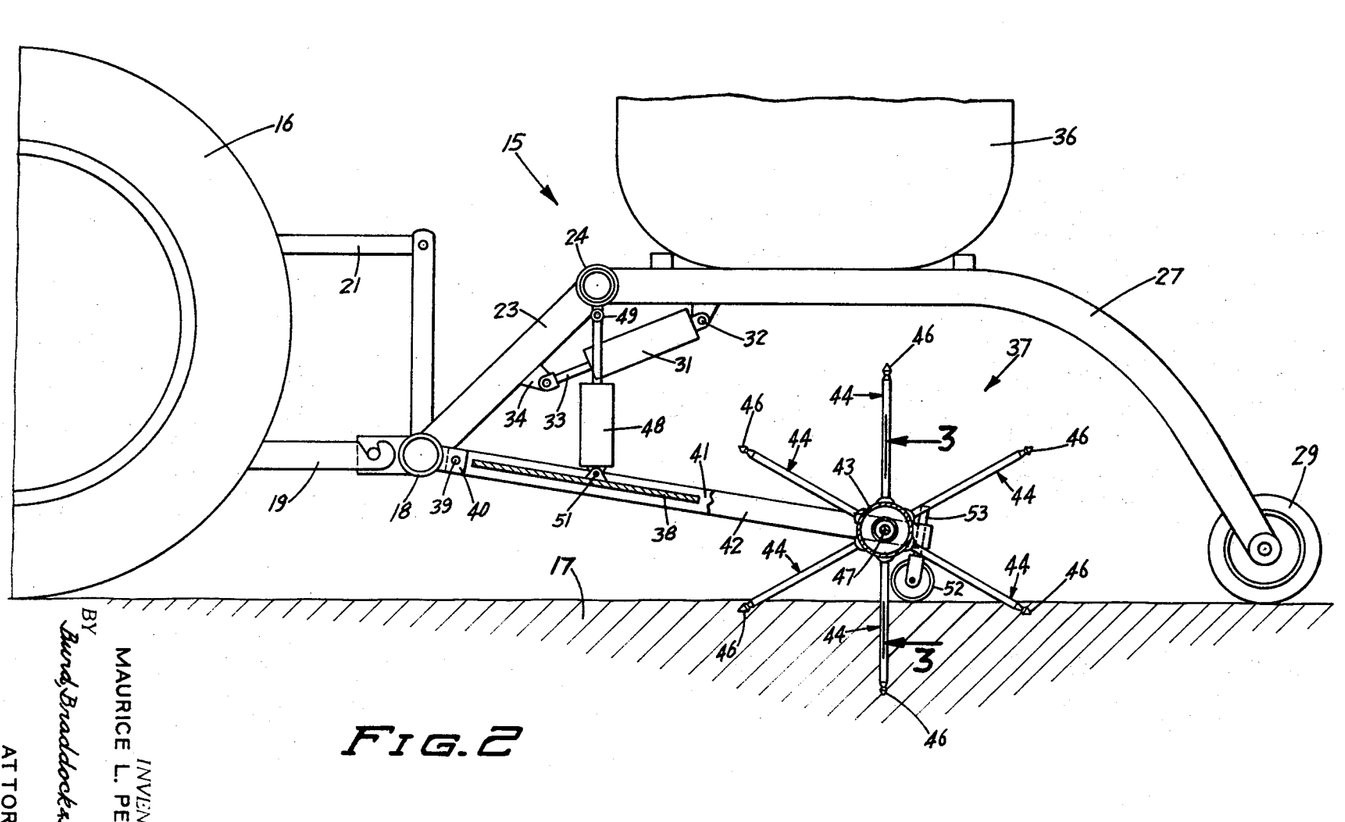
FIG. 2 is an enlarged side elevational view partly sectioned of the applicator of FIG. 1.

Referring to the drawings, there is shown in FIGS. 1 and 2 the fluid dispensing implement of the invention, indicated generally at 15, connected to a vehicle 16, as a tractor, operable to pull the implement over the ground 17. The implement 15 has a transverse tool bar 18 carried by the draft links 19 and control link 21 of the three point hitch of vehicle 16. Tool bar 18 can be supported with ground wheels and connected to the vehicle with a tongue.

Projected upwardly and rearwardly from opposite portions of the tool bar 18 are arms 22 and 23 carrying a transverse top beam 24 extended substantially parallel to the tool bar 18. Projected rearwardly from the beam 24 are longitudinal members 26 and 27 having rear portions that curve downwardly. Wheels 28 and 29 are rotatably supported on the rear ends of members 26 and 27. Wheels 28 and 29 may be caster wheels capable of pivoting about an upright axis. The forward ends of the longitudinal members 26 and 27 are pivotally mounted with sleeve couplings 30 to the transverse beam 24.

As shown in FIG. 2, the angular position between the longitudinal member 27 and the arm 23 is controlled by a hydraulic cylinder 31 pivotally connected to a downwardly directed ear 32 on the member 27. Projected from the opposite end of the cylinder 31 is a piston rod 33 pivotally connected to an ear 34 secured to the back of arm 23. A similar cylinder (not shown) is connected between the arm 22 and longitudinal member 26. The cylinders are operable to adjust the working depth of the implement.

A large transverse closed cylindrical tank 36 is mounted on the longitudinal members 26 and 27 for storing the chemical fluids to be dispensed into the ground 17. The tank 36 may be removably mounted on the implement so that it can be replaced after all the fluid has been dispensed. The longitudinal members 26 and 27 can be used to tow a separate trailer carrying a chemical storing tank. Additional weights can be carried on members 26 and 27 if needed to aid in forcing spikes 44 into the ground.

Returning to FIG. 1, an array of side-by-side chemical injector units, indicated generally at 37, are positioned behind transverse tool bar 18 under the chemical storing tank 36. The injector units 37 are operable to inject chemicals, as fertilizers and/or herbicide solutions, periodically in spaced apart rows to provide an even pattern of chemical distribution in the ground 17. The injector units 37 are identical in structure and operate independently of each other to inject the chemical solution into the ground. The injector units 37 are pivotally connected to the tool bar 18 along the entire length thereof. The tool bar 18 may be laterally extended with side extensions to increase the working width of the implement. For example, the units 37 can be spaced about 20 inches from each other so that the chemical is injected in the soil in relatively close rows.

The following description is limited to a single injector unit. Injector unit has an elongated rearwardly directed frame 38 having a forward end carrying a transverse pivot 39 extended through a block 40 secured to the back side of tool bar 18. Frame 38 has rearwardly directed side members 41 and 42 located on opposite sides of a drum 43 carrying a plurality of outwardly directed radial spikes or teeth, indicated generally at 44. As shown in FIG. 2, each spike 44 has a removable injector tip or head 46 located at the outer end thereof forming a ground penetrating point. Drum 43 is mounted on a transverse axle 47 rotatably mounted with suitable bearings 47A, shown in FIG. 3, on the end portions of the side members 41 and 42.

Returning to FIG. 2, the frame 38 is held in ground working location with a biasing means 48 secured to the top transverse beam 24 with a top connector 49. The lower end of the biasing means is connected to midportion of the frame 38 with a bottom connector 51. The biasing means 48 may be a double acting hydraulic cylinder or an upright rod carrying a compression coil spring. The hydraulic cylinder may be used to control the working depth of the spikes in conjunction with a hydraulic cushion for the injector unit. All the hydraulic cylinders can be connected to each other to equalize the loads on all the injector units.

A gage wheel 52 rotatably mounted on an upright shank 53, is operable to adjust the working depth of the spikes 44. The shank 53 is adjustably mounted on the rear portion of side member 41 whereby the elevation of the drum 43 may be adjusted. The biasing means 48 continuously urges the wheel 52 in engagement with the surface of the ground 17. When the spike 44 encounters a hard object, as a rock, stone or the like, the frame 38 is moved upwardly against the force of the biasing means until the spike rides over the object.

Figure 3:
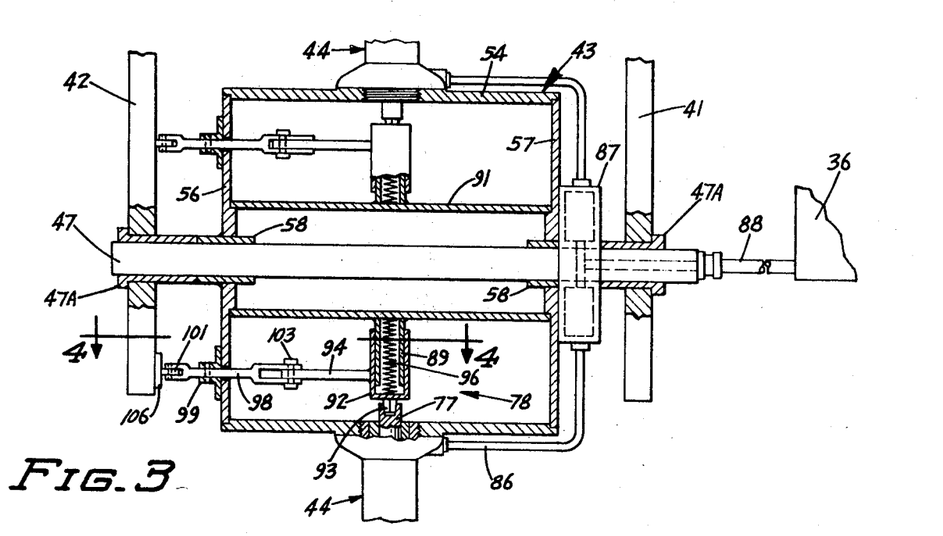
FIG. 3 is an enlarged sectional view taken along the line 3—3 of FIG. 2.

As shown in FIG. 3, drum 43 has an outer cylinder 54 carrying the spikes 44. Secured to opposite sides of cylinder 54 are sideplates 56 and 57. Sleeve bearings 58, joined to the center portions of the sideplates 56 and 57, accommodate the axle 47 whereby the drum 43 rotates on the axle 47.

Figures 6, 7, 8:
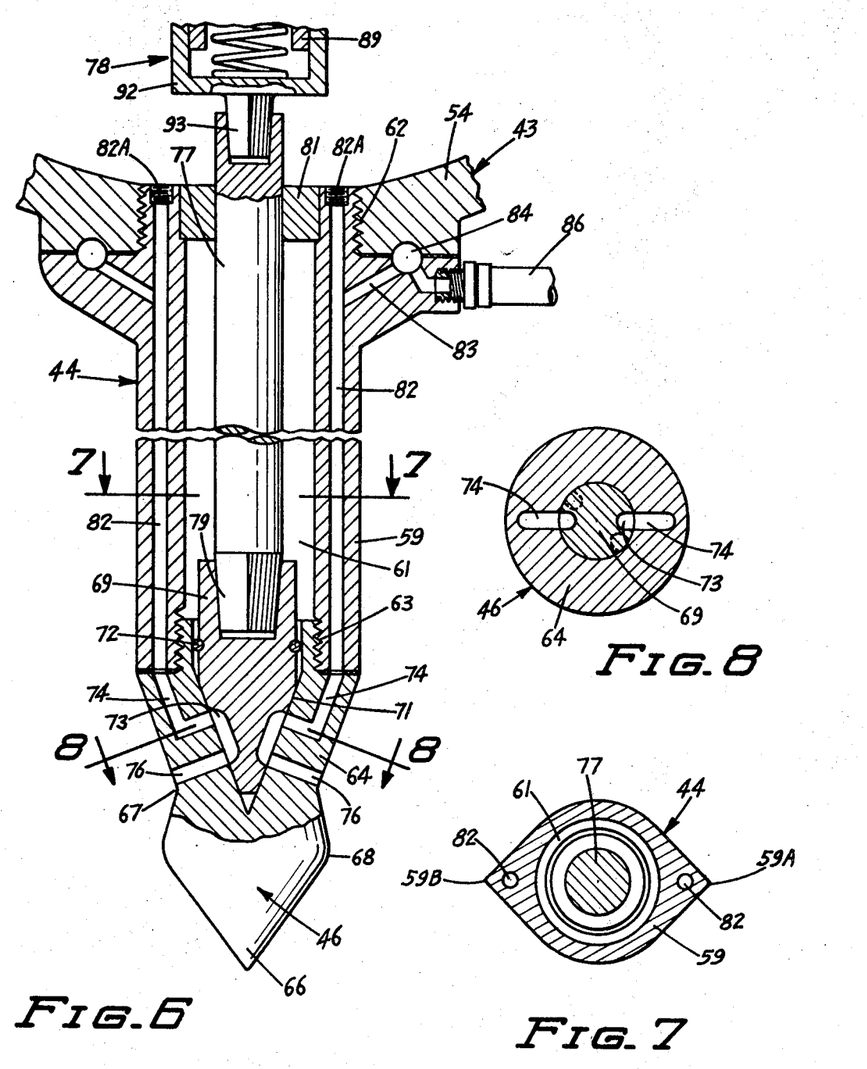
FIG. 6 is a foreshortened longitudinal sectional view of an injector spike showing the valve mechanism in the open position.
FIG. 7 is a sectional view taken along the line 7—7 of FIG. 6.
FIG. 8 is a sectional view taken along the line 8—8 of FIG. 6.

The spike 44 shown in FIG. 6 has an elongated body 59 having a generally diamond-shaped cross section. The body 59 can have a length of 10 to 18 inches. Body 59, shown in FIG. 7, has a leading edge 59A and a trailing edge 59B located in longitudinal alignment to facilitate the penetration of the spike into the ground. Returning to FIG. 6, extending longitudinally through the body is a passage 61 open to the tip 46 and the inside of drum 43. The inner end of body 59 has a threaded portion 62 that is turned into a threaded bore in cylinder 54. The opposite or outer end of the body 59 is attached to the tip 46.

Tip 46 has an extension 63 threaded into the body 59 to removably mount the tip on the body. The middle portion 64 of the tip tapers inwardly and is joined to a cone-shaped point 66. The midriff of the tip 46 has an inwardly directed recess 67. The point has an outwardly projected ridge 68 to provide a shield for the exit openings in the tip. Located within a chamber in the tip 46 is a valve 69 having an outwardly directed cone face 71 in surface engagement with a corresponding cone face in the tip 46. The valve 69 has a cylindrical portion surrounded by an annular seal 72 in surface engagement with the cylindrical inner face of the threaded portion 63. The valve 69 has communicating passages 73 open to the cone face 71. The passages 73 are in alignment with inlet passages 74 and outlet passages 76 located in the midportion 64 of the tip 46. As shown in broken lines in FIG. 8, the valve 69 can be rotated whereby the communicating passages 73 are located out of alignment with the passages 74 and 76. With the valve 69 in this position, the flow of fluid from the tip is shut off. FIG. 6 shows the rotational position of the valve wherein the communicating passages 73 are registered with the inlet passages 74 and outlet passages 76.

Valve 69 is operatively connected with a longitudinal control rod 77 located in passage 61. The inner end of control rod 77 is operatively connected to a timer mechanism 78 which functions to rotate the rod to open the valve 69 when the tip 46 is in the ground penetrating position. The lower end of rod 77 has a noncircular portion 79 which fits into a corresponding socket in the inner end of valve 69. The upper end of rod 77 is rotatably mounted in a sleeve 81 fitted into the inner end of body 59.

The body 59 has longitudinal passages 82 closed at the inner ends with plugs 82A. Passages 82 are in communication with the inlet passages 74 of the tip 46. The inner ends of the passages 82 are in communication with feeder passages 83 leading from a header ring opening 84.

The chemical fluids are supplied to the spike through a hose or pipe 86 coupled to the supply tank 36. Suitable valves and pressure regulating means may be used to provide a continuous supply of fluid to the line 86. As shown in FIG. 3, line 86 is connected to a rotary coupling 87 secured to the sideplate 57 surrounding the shaft 47. The fluid is fed into the coupling 87 through passages in the axle 47. A hose or pipe 88 connects the axle 47 to the storage tank 36. The rotary coupling 87 and line 86 may be located within the drum 43 so that both the coupling 87 and the line 86 are protected by the drum.

Figure 4:
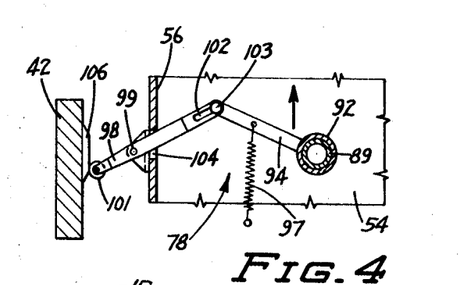
FIG. 4 is a sectional view taken along the line 4—4 of FIG. 3 showing the valve actuating mechanism in the valve open position.
Figure 5:
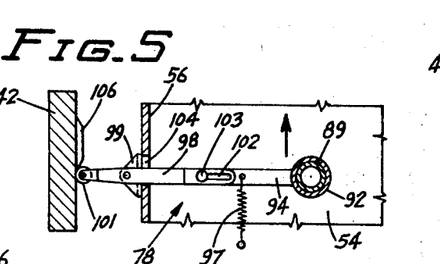
FIG. 5 is a view similar to FIG. 4 showing the valve actuating mechanism in the valve close position.

Referring to FIGS. 3, 4, and 5, there is shown the operator timing mechanism 78 comprising an inner cylindrical member 89 located within the drum 43. The inner end of member 89 is secured to a cylinder 91 concentric with the outer cylinder 54. Movably positioned in telescopic relation over the cylinder member 89 is a cup-shaped member 92. The outer end of member 92 has a drive projection 93 located in driving relation with the inner end of control rod 77. Projection 93 has a noncylindrical configuration which fits into a corresponding recess in the end of rod 77. Secured to the side and projected laterally from member 92 is a torque arm 94 for rotating the cup-shaped member 92. A coil spring 96, located within the cylindrical member 89, biases the cup-shaped member 92 and the control rod 77 in an outward direction thereby holding the valve 79 in surface engagement with the cone-shaped face of the tip 46. The arm 94 is biased by a spring 97 to hold the arm in a transverse position whereby the valve 69 is closed. An adjustable stop (not shown) may be mounted on cylinder 91 and engageable with the arm 94 to determine the closed position of arm 94.

Positioned outwardly from arm 94 is a lever 98 having a midportion connected to a pivot bracket 99 secured to the sidewall 56. The lever 98 extends through a hole 104 in the sidewall 56. The outer end of the lever 98 carries a roller 101. The inner end of arm 94 has a longitudinal slot 102 accommodating a pin 103 to pivotally connect the arm 94 with the lever 98. The roller 101 moves adjacent the side member 42 and engages a cam segment 106. As roller 101 moves over cam segment 106, the lever 98 pivots and opens the valve 69. FIG. 4 shows the roller 101 in engagement with the cam segment 106 whereby the arm 94 moves in a clockwise direction. The cam segment 106 may be adjustable in length to vary the time during which the valve 69 is opened. Alternatively, the cam segment 106 can be replaced with a longer cam segment thereby adjusting the length of time that the valve 69 is open.

Each of the spikes 44 has a similar operating timing mechanism 78 so that when the drum rotates the rollers 101 will consecutively engage the cam section 106 when the spike is in ground penetrating position. When the roller 101 leaves the cam section, the spring 97 returns the arm 94 and lever 98 to the straight line position, as shown in FIG. 5, closing the valve 69.

Figure 9:
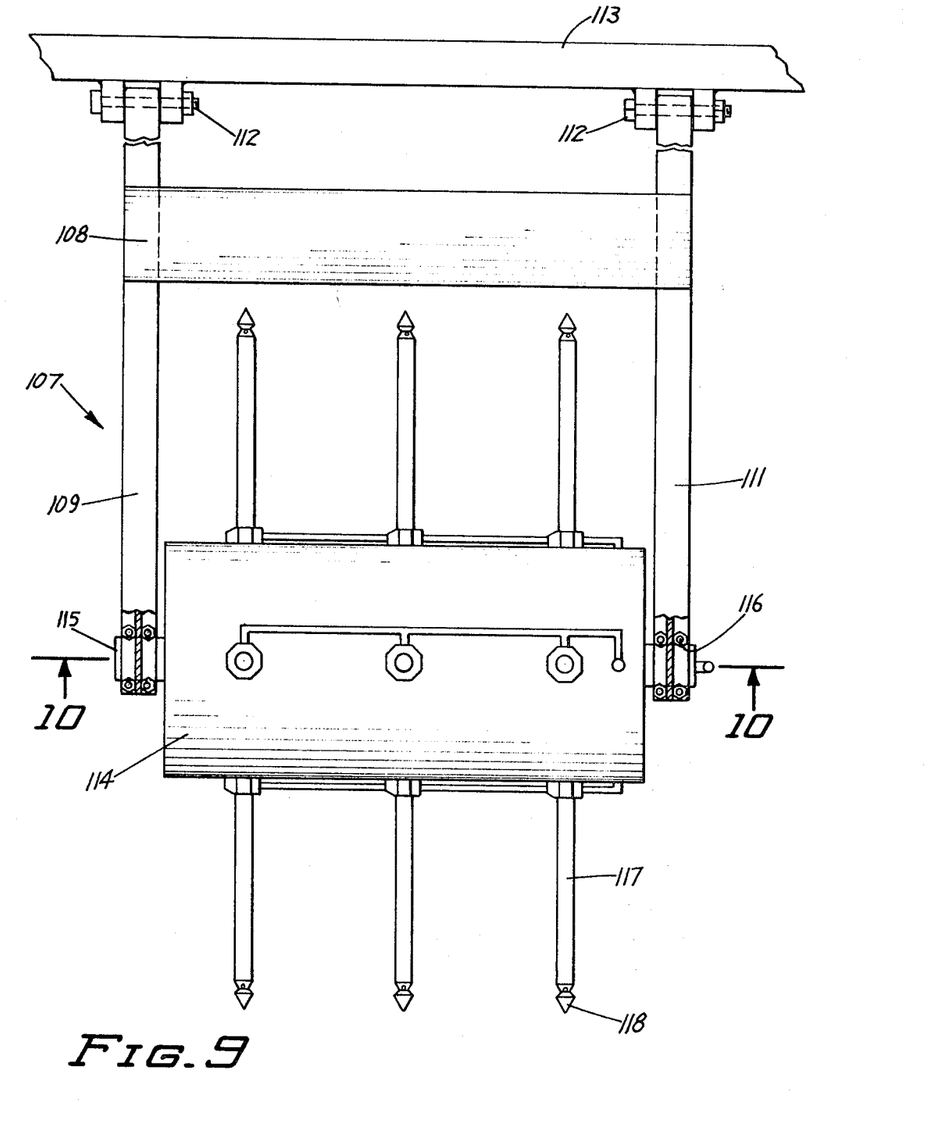
FIG. 9 is a plan view of a modified applicator unit of the invention.
Figure 10:
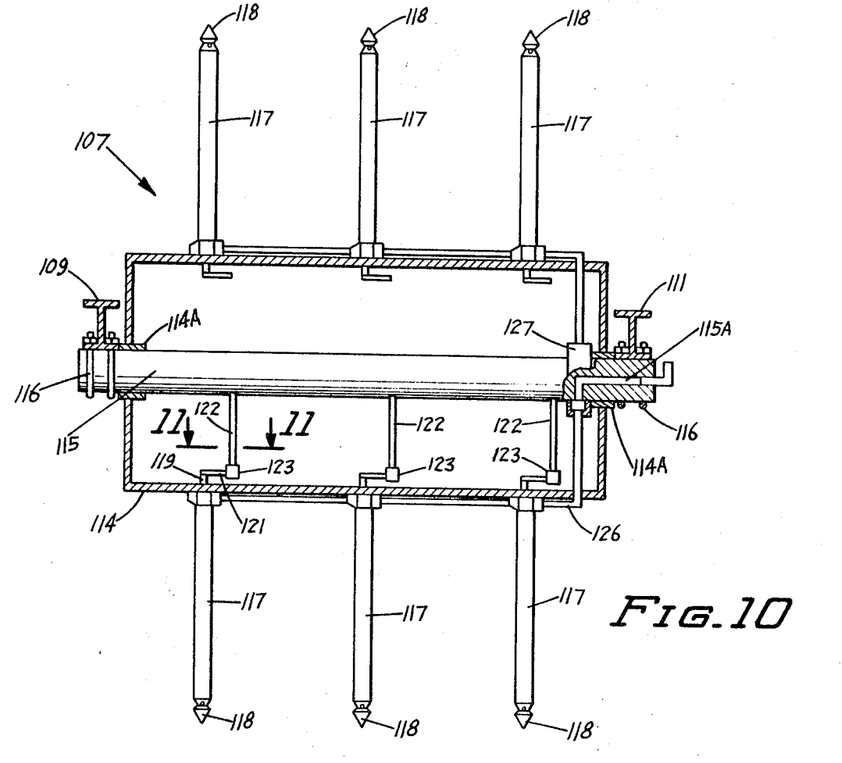
FIG. 10 is a sectional view taken along the line 10—10 of FIG. 9.

Referring to FIGS. 9 and 10, there is shown a modified injector unit, indicated generally at 107, adapted to be mounted on a transverse tool bar connected to a towing vehicle, as a tractor. Injector unit 107 has an elongated frame 108, including spaced longitudinal side members 109 and 111 and pivot assemblies 112 which pivotally mount the frame 108 on a transverse tool bar 113. Rotatably located between the outer ends of side members 109 and 111 is a drum 114. A fixed axle 115 extends through the drum. Bolt and nut assemblies 116 secure opposite ends of the axle to the side members 109 and 111. The sidewalls of the drum are secured to bearings 114A rotatably mounted on the axle 115. A plurality of injector spikes 117 are secured to the outside of the drum. The spikes extend outwardly in a radial direction and are spaced from each other circumferentially and in separate rows. The spikes may be secured to the drum in any pattern which insures substantially even distribution of chemicals into the ground.

Each spike has an injector tip 118 carrying a valve for controlling the dispensing of the chemical fluids into the ground. The spike 117 and tip 118 is identical in structure with the spike 44 and tip 46, as shown in FIG. 6. The control rod 119 for the valve extends into the inside of the drum 114. Secured to the inner end of the control rod 119 is a laterally directed arm 121 used to rotate the control rod 119 to move the valve located in the tip 118 to its open and closed position.

Figure 11:
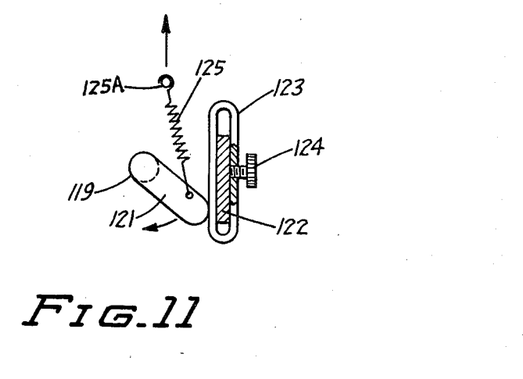
FIG. 11 is an enlarged sectional view taken along the line 11—11 of FIG. 10.

Secured to the fixed axle 116 are a plurality of downwardly directed fingers 122 located in general vertical alignment with the end portions of the arms 121. As shown in FIG. 11, each finger carries an adjustable cam segment 123 secured to the finger with a bolt 124. A spring 125, connected to a projection 125A on drum 114 and to arm 121, biases arm 121 and valve to the closed position. The angular position of the segment 123, relative to the arm, can be adjusted so that the timing of the dispensing can be changed. Segments having different lengths can be used to vary the duration or dwell during which the valve is open. Also, the segments can be constructed with adjustable members to change the operating length of the segments.

The chemical fluid is supplied to each of the spikes 117 by fluid lines 126 connected to a rotary coupling 127 surrounding the shaft or axle 116. The fluid supplied from the tank flows through a passage 115A in the axle and into the rotary coupling 127.

In use, as the drum 114 rotates over the ground, the spikes 117 selectively penetrate the ground. When the tips 118 are in the ground located position, the arms 121 engage the fixed cam segments 123 and rotate the valves to the open positions. The chemical fluid, being under pressure, is discharged through the discharge outlets into the ground. As the spikes 117 are withdrawn from the ground, the arms 121 leave the cam segment 123. The springs 125 return the arms 121 and the valve to the closed position.

Figure 12:
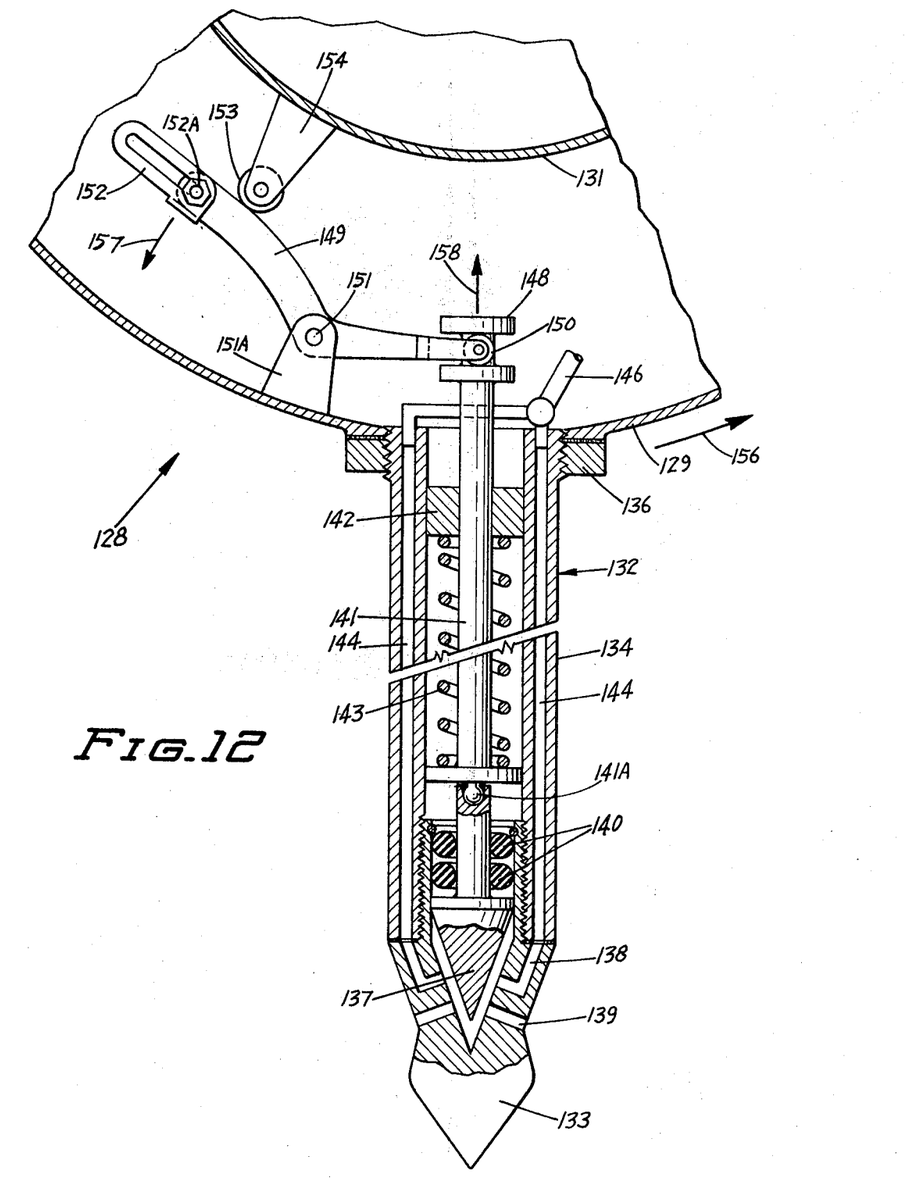
FIG. 12 is a sectional view of a further modification of the valve and valve operating mechanism associated with a soil penetrating tooth mounted on a drum.

Referring to FIG. 12, there is shown a further modification of the injector unit, indicated generally at 128, for dispensing chemical fluids into the ground. Injector unit 128 has a drum 129 mounted on a fixed axle or cylinder 131. Secured to the outside of the drum are radially directed spikes 132 having removable ground penetrating tips 133. Each spike 132 has an elongated tubular body 134 secured to a nut 136 attached to the drum 129. Located in the tip 133 is a valve 137 operable to open and close inlet and outlet passages 138 and 139. The valve 137 moves in a longitudinal direction, as opposed to rotation, as valve 69 shown in FIG. 6. O-rings 140 surround a control rod 141 and engage a cylindrical portion of the tip 133 to seal the valve 137 within the tip. The control rod 141 is secured to the top of the valve 137 with a ball and socket joint 141A to provide limited lateral movement of valve 137 to insure proper sealing thereof. The upper end of rod 141 extends through a sleeve 142 mounted in the inner end of body 134. A coil spring 143 surrounding the rod 141 biases the valve 134 to the closed position.

Body 134 has longitudinal passageways 144 in communication with the inlet passages 138 in the tip 133. The opposite end of passageways 144 are connected to a line 146 for carrying chemical fluids from a rotary coupling (not shown) to the spike 132. The rotary coupling is connected to the chemical fluid storage tank. The upper end of the control rod 141 is located inside the drum 129 and carries a two-piece axially split head 148. A circumferentially positioned lever 149 has one end carrying a roller 150 located between the head 148 to move the valve 137 to open and closed positions. The midportion of the lever 149 is pivotally mounted on a pivot 151 secured with bracket 151A to the inside of drum 129. The tail 152 of the lever 149 is circumferentially adjustable with a fastener 152A to vary the dwell or time in which the valve 137 is open. The tail 152 engages a roller 153 mounted on a fixed bracket 154 secured to the axle 131. As the drum rotates in the direction of the arrow 156, the roller 153 engages the top of lever 149 and tail 152 when the spike 132 is in ground penetrating position. Roller 153, acting on lever 149, holds the valve 137 open. As soon as the lever 149 moves from the roller 153, the spring 143 closes the valve 137.

The above description is directed to preferred embodiments of the fluid injector units for dispensing an even pattern of agricultural fluid chemicals into the ground. Substitutions, omissions, changes in form and details of the structures illustrated and described may be made by those skilled in the art without departing from the spirit of the invention. For example, the spacing of the spikes on the drums may be varied to produce various equal fluid dispensing patterns. The spikes may be located in a spiral pattern around the drum. The length of the spikes may be varied. The diameter of the spike carrying drums may vary in size and the number of spikes carried on the drums may vary.

In the claims:

1. An implement for injecting a fluid like material below the surface of the ground comprising: a support member adapted to be moved over the ground, frame means connected to the support member, rotatable means rotatably mounted on the frame means, a plurality of outwardly directed spikes secured to the rotatable means to penetrate the surface of the ground, means for directing fluid material through the spikes, first means at the outer end portion of each spike positionable entirely below the surface of the ground on movement of the spike into the ground, said first means having at least one fluid discharge passage for directing fluid into the ground below the surface thereof, valve means having a movable member located within the first means to selectively open and close said fluid discharge passage, and operator means connected to the movable member for opening said fluid discharge passage when the first means on the spike has penetrated the surface of the ground and closing the fluid discharge passage when the spike leaves the ground.

2. The implement of claim 1 wherein: the frame means is pivotally connected to the support member so that the rotatable means can ride with the contour of the ground, and means connected to the frame means and support member for biasing the rotatable means and spikes thereon toward the ground.

3. The implement of claim 2 including: gage wheel means mounted on the frame means for limiting the penetrating depth of the spikes.

4. The implement of claim 1 wherein: the first means is a tip attached to the outer end of the spike.

5. The implement of claim 4 wherein: the operator means includes an actuator to rotate the movable member of the valve means between its open and closed positions, and a fixed member engageable with the actuator to open and hold open the movable member when the tip is below the surface of the ground.

6. The implement of claim 4 wherein: the operator means includes an actuator mounted on the rotatable means to longitudinally move the movable member of the valve means between its open and closed positions, and fixed means engageable with the actuator to open and hold open the movable member when the tip is below the surface of the ground.

7. The implement of claim 6 including: a rod located in the spike and attached to the movable member of the valve means, said actuator comprising a lever connected to the rod, said fixed means including means engaging said lever.

8. The implement of claim 4 including: a rod located in the spike drivably coupled to the movable member of the valve means, said operator means comprising an arm drivably coupled to the rod, and fixed means for moving the arm to open and hold open the movable member of the valve means when the tip is below the surface of the ground.

9. The implement of claim 4 wherein: the tip has an annular recess, said fluid discharge passage exiting at said recess.

10. The implement of claim 1 wherein: each spike has an elongated body with fluid carrying passageways in communication with the fluid discharge passage, 11. A fluid dispensing apparatus comprising: rotatable means having an elongated spike adapted to sequentially penetrate into the ground and move out of the ground on rotation of the rotatable means, a head secured to the outer end of the spike, said head having fluid discharge passage means, means in the spike to supply the head with fluid to be dispensed through the fluid discharge passage means in the ground, below the surface of the ground, valve means within the head to control the flow of fluid through the head, said valve means having a movable member operable to selectively open and close said fluid discharge passage, and means connected to the movable member operable to selectively move the movable member to open and close said fluid discharge passage, to operate the valve means to dispense fluid when the head is below the surface of the ground and close the fluid discharge passage when the spike is spaced above the surface of the ground.

12. The apparatus of claim 11 wherein: the head has fluid discharge openings and a recess, said openings open to said recess.

13. The apparatus of claim 11 wherein: the head is removably attached to the spike.

14. The apparatus of claim 11 wherein: the head has an internal chamber, said valve means movably located in said chamber.